United States Patent Office 3,468,843
Patented Sept. 23, 1969

3,468,843
FLAME RESISTANT 66 NYLON AND PROCESS THEREOF
Warren F. Busse, Wilmington, Del., assignor to E. I. du Pont de Nemours and Company, Wilmington, Del., a corporation of Delaware
No Drawing. Filed Sept. 1, 1965, Ser. No. 484,454
Int. Cl. C08g 51/56; C09k 3/28
U.S. Cl. 260—45.75     7 Claims

ABSTRACT OF THE DISCLOSURE

Polyhexamethylene adipamide is made flame retardent by incorporation therein of 5 to 30 percent by weight of a halide of Zn, Cd, Pb, or rare earth metal or 3 to 15 percent by weight of one of these halides plus 1 to 5 percent by weight of a metal, e.g., Sn, or Cuo. The resultant composition can be used as a wire coating.

---

This invention relates to flame-retardent compositions of polyhexamethylene adipamide.

Polyhexamethylene adipamide (66 nylon) is rated as self-extinguishing by the ASTM D-635 test. In this test, a bar is held horizontally over a screen, and a flame is applied to the end of the bar. The heat melts the nylon, and then ignites the surface of the molten polymer. The melting point of the nylon is about 250° C., at which temperature it forms around a low viscosity liquid. When this liquid is further heated to about 400-450° C., it pyrolyzes to volatile flammable products which are ignited by the flame. The large difference between the melting point and the ignition temperature, coupled with the low viscosity of their melt, permit the molten 66 nylon to drip off the bar, carrying the flame with it. The burning droplets may fall on the screen, and be extinguished due to the heat conduction of the screen. The 66 nylon then receives a rating of "self-extinguishing." However, under some conditions, the liquid droplets can continue to burn, thus spreading the fire.

An increase in the melt viscosity of the nylon, making the burning liquid drip off the bar more slowly, would increase the apparent flammability of the nylon. Likewise, changing the shape of the polymer to a thin film coated on a metal sheet or wire, will retard the flow of the melt and make the nylon appear to be more flammable. This effect is particularly important in electrical applications.

Attempts to decrease the flammability of 66 nylon have generally been unsuccessful because of the high melting point and the chemical character of the polymer. Thus, known fire-retarding agents such as halophosphates and chlorinated paraffin+$Sb_2O_3$ not only fail to work but have the opposite effect by catalyzing pyrolysis of the polymer to combustible gases. Common incombustible fillers such as asbestos and silica also make the polymer burn more readily. In addition, the commonly employed halide and phosphate flame retardents decrease the melt viscosity of 66 nylon to increase its tendency to drip. A further complication in reducing the flammability of 66 nylon resides in the carbonamide linkages in the polymer chain, which linkages are considerably more reactive than many other polymer linkages, such as those of olefins, particularly at the high fabrication temperatures, e.g. 240–300° C. Reaction between the polymer and candidates for fire retardance under such conditions caused degradation of the polymer to destroy its utility. Consequently, the problem of the flammability of 66 nylon and a need for the solution of this problem still remains.

It has now been discovered that the flammability of 66 nylon can be drastically reduced by char-producing dehydrogenation catalysts which are substantially non-reactive with the polyamide except at its pyrolysis temperatures. By "except at its pyrolysis temperature" is meant the reaction between the catalyst and the nylon occurs before the normal decomposition of the nylon to flammable products. The catalysts include the systems (1) a metal halide having the stated non-reactivity or (2) the combination of the metal halide of (1) with a metal having the stated reactivity but which as a halide is reactive with the polyamide at or below its processing temperature. When catalyst (2) is used, less of the metal halide is required than when catalyst (1) is used.

Examples of metal halides include the halides of Zn, Cd, Pb, and the rare earths, particularly Ce. Examples of metals include Cu, Zn, Cd, Hg, Al, Sn, Sb, Pb, Mn, Fe, and Co. Copper oxide can be used in place of these metals. When catalyst (2) is employed, the metal component is selected so that at pyrolysis temperatures, it is reactive with the metal halide component. Accordingly, a metal other than that which is employed in the metal halide is used. Reaction between the elemental metal, including copper oxide, and the metal halide of catalyst (1) produces a more reactive metal halide of the elemental metal in situ. Generally, the halides which are produced in situ would react with the polyamide at processing temperatures to cause its degradation, had the reactive halide been added as such prior to processing.

The fact that the catalyst functions to dehydrogenate the polyamide and yet reduces its flammability is surprising since the evolution of hydrogen from the polyamide would be expected to increase its flammability.

The residual char supplies the beneficial effects of being relatively slow burning in the heat of the flame and self-extinguishing when the flame is removed. The char also shields the remaining polyamide from the heat of the flame.

The effects, dehydrogenation and char formation, represent a change in the mechanism of pyrolysis of the 66 nylon, which ordinarily does not char. These effects are highly selective with respect to the polyamide employed since neither 610 nylon or the copolymer 6/66/610 nylon exhibit reduced flammability when the catalysts (1) or (2) are incorporated therein. More particularly, these latter nylons are dehydrogenated by the catalysts, but char formation does not occur.

The nylons used in the compositions of the present invention can be the 66 nylons which are commercially available. However, the nylons should not contain low molecular weight products that will volatilize to give combustible mixtures at relatively low temperatures, nor should the nylons contain moisture or catalysts that tend to reduce the molecular weight during fabrication, or catalyze the pyrolysis to volatile products at relatively low temperatures. With due regard for these requirements, the resin can be compounded with stabilizers, coloring, or modifying agents such as antiozidants, pigments, and reinforcing materials.

With respect to the fire-retardant catalyst, it is important that this additive not react with the polyamide at the processing temperature of the particular nylon, which will usually fall between 240 to 300° C. Should such reaction occur, the nylon would be degraded to a useless product. The halides of Co, Cr, and Fe are examples of compounds that are too reactive to be used according to the present invention. Reaction between the catalyst and polyamide can be minimized by using thoroughly dried materials during compounding and by using minimum molding time and temperatures for the final composition. By such techniques, halides which are normally reactive with the polyamide under processing conditions can be rendered substantially unreactive.

Generally, from 3 to 30% of the flame-retardant catalyst is an effective amount which will give beneficial results. The exact amount of flame-retardant catalyst that is employed will depend on the particular catalyst system employed and its composition, on the particular nylon being treated, and on the processing temperatures to be used. When the catalyst is the metal halide by itself, from 5 to 30% can be used. This amount can be reduced to 3 to 15% when catalyst (2) is used, in which 1 to 5% of the metal or copper oxide is used. Preferred metal halides are the metal chlorides in the amount of 5 to 20% in catalyst (1). When the corresponding iodide or bromide is used, 10 to 30% is preferred. The foregoing percents are by weight based on the weight of the total composition.

The 66 nylon resin and flame-retardant catalyst can be compounded to form an intimate mixture by any of the well-known methods and machines available, with precautions being taken to minimize or avoid degradation as previously described. The ingredients can be mixed in the dry form and then be extruded or milled and molded to the desired shape. The catalysts can be incorporated into the molten polymer as it is synthesized, if the time-temperature cycle is not such as to cause premature decomposition. Useful compounding machines include the Banbury mill, extruders, and the like. Since 66 nylon in the molten condition is subject to oxidation, it is desirable to conduct the compounding in the absence of air, as by having the atmosphere present in the mixing equipment an inert gas such as nitrogen. These compositions can be fabricated into useful articles, such as wire coating or films, or molded or extruded shapes by the conventional techniques which are applicable to polyamides. The resultant articles have improved fire retardance.

In the following examples, polyhexamethylene adipamide of molding grade is used as the base resin. The resin in the form of molding granules is first ground to −80 mesh in liquid nitrogen. The flame retardant agent in dry powdered form (−40 mesh) is dry blended with the ground resin, and the resultant blend is injection molded into ½" x ⅛" x 5" test bars in a one-inch diameter injection molding machine equipped with a rotating torpedo to insure good mixing. For wire coating, the dry blend is passed through a melt indexer equipped with a crosshead die and takeup for the coated wire; both bare copper wire and polyvinyl chloride coated wire have been coated with 66 nylon in this manner.

The vertical bar flammability test is conducted by igniting the lower end of the test bar with the blue flame of a Bunsen burner for 15 sec and then removing the bar from the burner flame to visually observe the results. This test is more severe than the ASTM D-635 test. The flammability test results are evaluated in terms of whether or not a char forms at the area of direct exposure to the flame, whether or not dripping of the polymer occurs, and the burning or non-burning characteristics of the test bar after the burner flame is removed.

The thin film on wire test is conducted by suspending about a 12" length of the 66 nylon coated wire between grips on a bar that can be rotated about a horizontal axis. A Bunsen burner flame is brought into contact with the lower part of the wire for 15 sec. An angular indexer is provided to note the angle of rotation of the coated wire from the vertical position. Shielding is also provided to exclude air currents from the coated wire under test. Results of this test are evaluated in terms of the minimum angle from the vertical at which the flame goes out before traveling the length of the wire.

EXAMPLES 1–33

The following compositions are subjected to the vertical bar flammability test:

TABLE I

| Example | Metal halide | Wt. percent | Metal | Wt. percent | Molding temp., °C. |
|---|---|---|---|---|---|
| 1 | CdCl$_2$ | 30 | | | 250 |
| 2 | CdCl$_2$ | 20 | | | 280 |
| 3 | CdCl$_2$ | 10 | | | 280 |
| 4 | CdCl$_2$ | 5 | | | 280 |
| 5 | CdCl$_2$ | 3 | | | 265 |
| 6 | CdI$_2$ | 20 | | | 270 |
| 7 | CdBr$_2$ | 20 | | | 270 |
| 8 | CdBr$_2$ | 5 | | | 280 |
| 9 | CdCl$_2$ | 10 | Cu | 3 | 252 |
| 10 | CdCl$_2$ | 5 | Cu | 3 | 270 |
| 11 | CdCl$_2$ | 5 | Cu | 1 | 270 |
| 12 | ZnCl$_2$ | 25 | | | 265 |
| 13 | ZnCl$_2$ | 20 | | | 280 |
| 14 | ZnCl$_2$ | 10 | | | 275 |
| 15 | ZnBr$_2$ | 20 | | | 270 |
| 16 | ZnI$_2$ | 20 | | | 270 |
| 17 | PbCl$_2$ | 30 | | | 240–275 |
| 18 | PbCl$_2$ | 20 | | | 280 |
| 19 | PbBr$_2$ | 20 | | | 275 |
| 20 | PbBr$_2$ | 5 | | | 280 |
| 21 | CdCl$_2$ | 5 | Sb | 3 | 260 |
| 22 | CdCl$_2$ | 3 | Al | 3 | 260 |
| 23 | CdCl$_2$ | 10 | Sn | 3 | 250–260 |
| 24 | CdCl$_2$ | 3 | Sn | 3 | 260 |
| 25 | CdCl$_2$ | 5 | Zn | 3 | 252 |
| 26 | CdCl$_2$ | 10 | Pb | 3 | 252 |
| 27 | CdCl$_2$ | 10 | Fe | 3 | 252 |
| 28 | CdCl$_2$ | 10 | Ni | 3 | 252 |
| 29 | CdCl$_2$ | 5 | Sb | 3 | 270 |
| 30 | CdCl$_2$ | 5 | Al | 3 | 270 |
| 31 | CdCl$_2$ | 3 | Cu$_2$O | 3 | 260 |
| 32 | CdCl$_2$ | 3 | Cu | 3 | 255 |
| 33 | CeCl$_2$ | 25 | | | 280 |

The results of tests are that except for Examples 5 and 20, the compositions do not drip and are self-extinguishing either immediately or in a matter of a few seconds due to the formation of char. At low concentrations of catalyst, i.e. about 5% some burning of the polyamide occurs when exposed to the yellow flame of the bunsen burner rather than the blue flame. For the compositions of Examples 5 and 20, some charring occurs but is insufficient to prevent the composition from forming molten polyamide which leaves the test bar as flaming droplets.

When 610 nylon, instead of 66 nylon employed in the above examples, containing 10% by wt. CdCl$_2$ is subjected to the vertical bar test, no char is formed and the flame drips off the test bars. When CdO, CdCO$_3$, or CdSO$_4$ is used in place of the CdCl$_2$ in Example 2, the resultant test bar exhibits only slight char and the flame drips off. The same result is obtained when PbO is used in place of PbCl$_2$ in Example 18.

When the test bar of Example 1 is tested for flammability according to ASTM D-635, the bar does not melt or drip as does normal 66 nylon; instead the bar chars without dripping, and the bar is self-extinguishing.

Surprisingly, the effects of high loadings of some metal halide on the tensile properties of 66 nylon are small, as is illustrated for CdCl$_2$ in the following table:

TABLE II

| Amount CdCl$_2$ Wt. percent | Tensile Properties 10$^3$ p.s.i. | | | Elongation, percent |
|---|---|---|---|---|
| | Yield | Ultimate | Modulus | |
| 0 | 10.8 | 6.7 | 475 | 35 |
| 10 | 14.4 | 10.9 | 514 | 9 |
| 10 | 15.6 | 13.3 | 563 | 7.2 |
| 20 | 16.2 | 13.9 | 537 | 4.5 |
| 30 | 17.5 | 15.6 | 543 | 4.2 |

EXAMPLES 34–42

Flammability tests are conducted with various 66 nylon compositions coated 5 mil thick on 19 gage copper wire with the following results:

TABLE III

| | Halide | Wt. percent | Metal | Wt. percent | Minimum non-burning angle, ° |
|---|---|---|---|---|---|
| Example: | | | | | |
| 34 [1] | $CdCl_2$ | 25 | | | 0 |
| 35 | $CdCl_2$ | 20 | | | 0 |
| 36 | $PbCl_2$ | 20 | | | 0 |
| 37 | $CdCl_2$ | 10 | | | 5 |
| 38 | $CdCl_2$ | 5 | Cu | 3 | 5 |
| 39 | $CdCl_2$ | 5 | | | 10 |
| 40 | $CdCl_2$ | 5 | Al | 1 | 10–15 |
| 41 [2] | $CdCl_2$ | 5 | | | 10–15 |
| 42 | $CdCl_2$ | 10 | Cu | 3 | 0 |

[1] 20 mil coating.
[2] 8 mil coating.

When 66 nylon, not containing metal halide according to the present invention, is subjected to the same test (5 mil coating) the minimum non-burning angle is 12–20°.

EXAMPLE 43

The dehydrogenation effect of the metal halide catalysts of this invention is illustrated in the following table which shows the amount of hydrogen present (mass spectroscopic analysis) in gases evolved from the pyrolysis of compositions in which 66 nylon is the polyamide component.

| | Wt. percent | $H_2$ in mole percent | |
|---|---|---|---|
| | | 300–350° C. | 350–400° C. |
| Metal halide: | | | |
| | | 0.8 | 0.2 |
| $CdCl_2$ | 20 | 52.5 | 74.4 |
| $ZnCl_2$ | 20 | 61.4 | 67.5 |
| $PbCl_2$ | 20 | 29.4 | 27.5 |

As many apparently widely different embodiments of this invention may be made without departing from the spirit and scope thereof, it is to be understood that this invention is not limited to the specific embodiments thereof except as defined in the appended claims.

What is claimed is:
1. A flame-retardant composition consisting essentially of polyhexamethylene adipamide and an effective amount in the range from 5 to 30 percent by weight of the halide of divalent Zn, Cd, or Pb, or rare earth metal.
2. The flame-retardant composition of claim 1 wherein said halide is chloride.
3. The flame-retardant composition of claim 2 wherein from 5 to 20 percent by weight of said chloride is present.
4. The flame-retardant composition of claim 3 wherein said chloride is $CdCl_2$.
5. The flame-retardant composition of claim 1 wherein said halide is iodide or bromide and from 10 to 30 percent by weight thereof is present.
6. A flame-retardant composition consisting essentially of polyhexamethylene adipamide and an effective amount in the range from 3 to 15 percent by weight of the halide of divalent Zn, Cd, or Pb, or rare earth metal, and from 1 to 5 percent by weight of copper oxide or Cu, Zn, Cd, Al, Sn, Sb, Pb, Mn, Fe, or Co metal.
7. The flame-retardant composition of claim 6 wherein said halide is chloride.

References Cited
UNITED STATES PATENTS

| | | | |
|---|---|---|---|
| 2,251,508 | 8/1941 | Watson | 260—78 |
| 2,299,839 | 10/1942 | McQueen | 260—78 |
| 2,422,666 | 6/1947 | Fuller | 260—78 |
| 2,705,227 | 3/1955 | Stamatoff | 260—78 |
| 2,739,139 | 3/1956 | Gabler et al. | 260—78 |
| 2,785,106 | 3/1957 | Mendelsohn | 260—78 |
| 2,869,973 | 1/1959 | Hubbard et al. | 260—78 |
| 3,037,001 | 5/1962 | Becke et al. | 260—78 |
| 3,067,168 | 12/1962 | Purdon | 260—78 |
| 3,189,575 | 6/1965 | Horn et al. | 260—78 |
| 3,340,227 | 9/1967 | Krieger | 260—78 |
| 3,080,345 | 3/1963 | Brooks et al. | 260—78 |

HAROLD D. ANDERSON, Primary Examiner

U.S. Cl. X.R.

260—45.7, 78; 117—161